United States Patent [19]

Barthel et al.

[11] Patent Number: 5,640,514
[45] Date of Patent: Jun. 17, 1997

[54] SYNCHRONIZATION METHOD FOR AUTOMATION SYSTEMS

[75] Inventors: Herbert Barthel, Herzogenaurach; Horst Daar, Erlangen; Hartmut Schuetz, Heroldsbach, all of Germany

[73] Assignee: Siemens Aktiengesellschaft, Munich, Germany

[21] Appl. No.: 213,653

[22] Filed: Mar. 16, 1994

[30] Foreign Application Priority Data

Mar. 16, 1993 [EP] European Pat. Off. ............. 93104243

[51] Int. Cl.[6] ........................................ G06F 11/30
[52] U.S. Cl. ........................................ 395/200.19
[58] Field of Search ........................ 395/550, 575, 395/181, 182.08, 182.09, 182.1, 200.19, 551, 553, 555; 364/283.3, 285, 285.4; 371/61, 47.1

[56] References Cited

U.S. PATENT DOCUMENTS

| | | | |
|---|---|---|---|
| 3,810,119 | 5/1974 | Zieve et al. | 340/172.5 |
| 3,921,149 | 11/1975 | Kreis et al. | 340/172.5 |
| 4,703,452 | 10/1987 | Abrout et al. | 364/DIG. 2 |
| 4,733,353 | 3/1988 | Jaswa | 364/DIG. 1 |
| 4,937,741 | 6/1990 | Harper et al. | 364/DIG. 1 |
| 5,193,175 | 3/1993 | Cutts, Jr. et al. | 395/575 |
| 5,226,152 | 7/1993 | Klug et al. | 395/575 |
| 5,233,615 | 8/1993 | Goetz | 321/36 |
| 5,239,641 | 8/1993 | Horst | 395/550 |
| 5,301,308 | 4/1994 | Daar et al. | 395/575 |
| 5,317,726 | 5/1994 | Horst | 395/575 |

FOREIGN PATENT DOCUMENTS

| | | |
|---|---|---|
| 0 104 490 | 4/1984 | European Pat. Off. . |
| 0 394 514 | 10/1990 | European Pat. Off. . |
| 0 447 576 | 9/1991 | European Pat. Off. . |
| 0 497 147 | 8/1992 | European Pat. Off. . |

OTHER PUBLICATIONS

Silbershatz, et al., *Operating System Concepts*; Addison--Wesley; 1994.

*Primary Examiner*—Thomas M. Heckler
*Attorney, Agent, or Firm*—Kenyon & Kenyon

[57] ABSTRACT

The present invention relates to synchronization methods for a redundantly structured automation system including at least two subsystems. According to the present invention, the sequences of machine instructions for the subsystems contain run-time queries. When the run-time queries are reached, the actual run time since the last synchronization of the subsystems is determined. However, a synchronization is only carried out when the actual run time exceeds a preselectable synchronization reference pattern. The run-time queries are always inserted then into the sequence of machine instructions when a summed run-time expected value of the machine instructions exceeds a preselectable critical time.

12 Claims, 2 Drawing Sheets

SYNCHRONIZATION METHOD FOR AUTOMATION SYSTEMS

BACKGROUND OF THE INVENTION

The present invention relates to synchronization methods for a redundantly structured automation system consisting of at least two subsystems interconnected via communication means. The present invention also relates to a method for generating a sequence of machine instructions from an application program for the subsystems of a redundantly structured automation system consisting of at least two subsystems.

Synchronization methods for automation systems are generally known. The automation system can work, for example, in clock-controlled or in event-controlled synchronism. Furthermore, the European Patent Application No. EP 0 497 147 A2 discusses a method for operating a redundantly structured programmable controller consisting of two subunits, in which the subsystems synchronize themselves, at the latest, after an expiration of a time preselectable by the user.

In methods known heretofore, any jumps (branching) occurring in the programs executed by the subsystems cause the "previous history" (previous state) to be lost. As a consequence, the subsystem in question can no longer determine when the last synchronization was performed. This in turn, requires a synchronization before any jump (branching) instruction. In this respect, the method according to the European Patent Application No. EP 0 497 147 A2 is not optimal since extra time is spent unnecessarily on the synchronization.

Therefore, there exists a need to definitely and reliably guarantee a reproducible alarm-reaction time, given the lowest possible degree of complexity, for synchronization tasks. Moreover, there exists a need to allow the computing capacity of the automation system to be better utilized by minimizing the degree of complexity required for synchronization. Furthermore, avoiding manual interventions in the application program, which could cause errors, is also desired.

SUMMARY OF THE INVENTION

The present invention fulfills the aforementioned needs by providing a synchronization method having the following features:

- identical sequences of machine instructions for the subsystems are executed concurrently in the subsystems, the sequences of machine instructions containing run-time queries;
- when one of the subsystems reaches a run-time query, the actual run time of that subsystem since the last synchronization of the subsystems is determined;
- a synchronization routine is invoked in that subsystem when the actual run time of that subsystem exceeds a preselectable synchronization reference pattern.

The sequences of machine instructions are produced from an application program. When the sequences of machine instructions are generated, the run times of the machine instructions are summed to obtain a run-time expected value. At the latest, when the run-time expected value exceeds a preselectable critical time, a run-time query is inserted into the sequence of machine instructions, and the run-time expected value is reset.

The sequences of machine instructions can be generated, with respect to the run time of the application program, in an interpreter. In the same way, the sequence of machine instructions can also be produced in advance with a compiler.

A virtually instruction-controlled, synchronous operation of the subsystems can be achieved as follows. When a run-time query is reached by one of the subsystems, the run-time query is not executed until the other subsystem reaches the corresponding run-time query in its sequence of machine instructions.

In a manner similar to the synchronization prior to jump (branching) instructions in the case of prior art, the present invention always inserts a run-time query into the sequence of machine instructions, in particular prior to conditional jump (branching) instructions.

When the preselectable critical time is less, especially considerably less, than the synchronization reference pattern for synchronizing the subsystems, the alarm-reaction time can be reproduced even more exactly.

DETAILED DESCRIPTION

Figure 1:
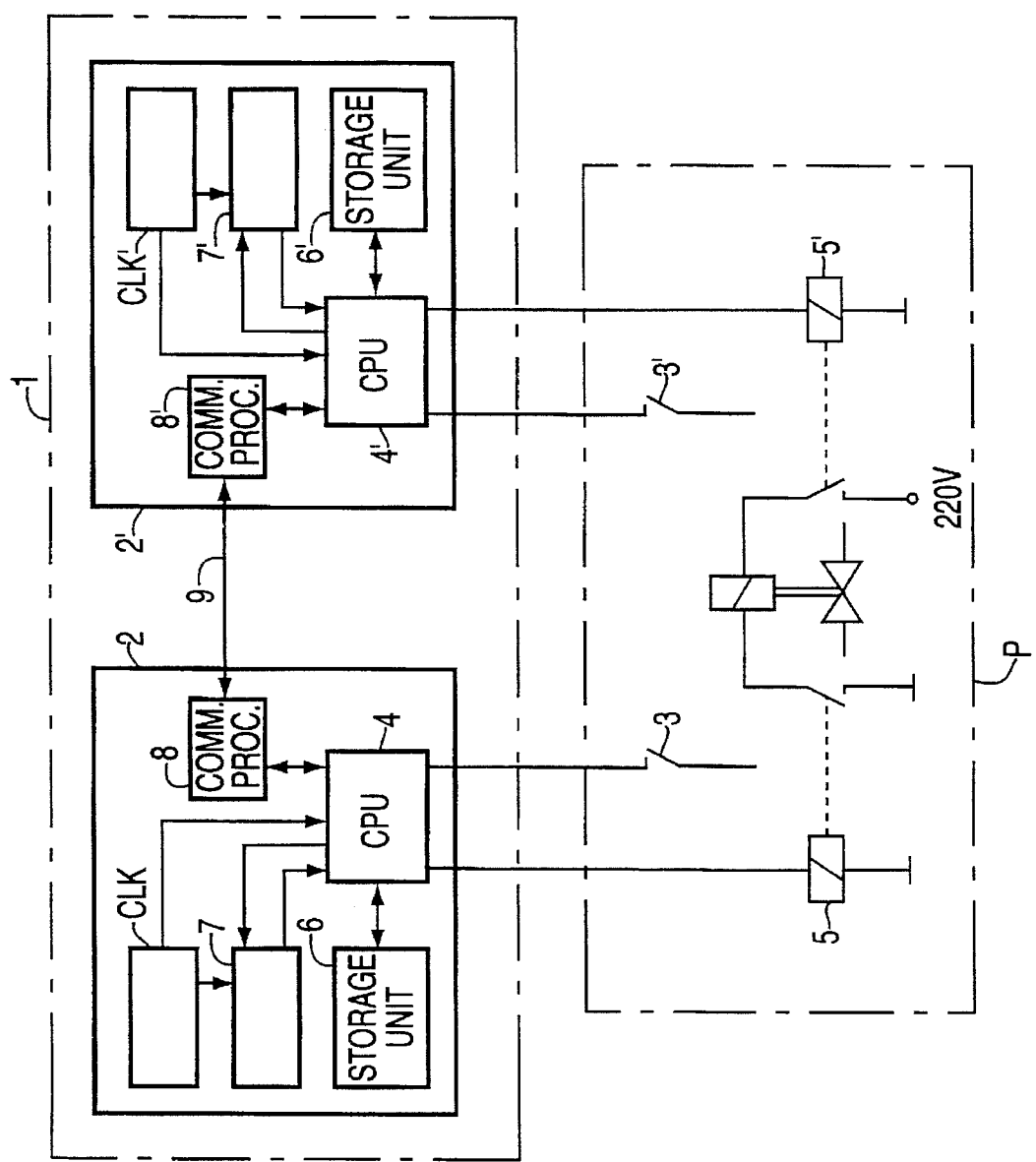
FIG. 1 is a block diagram of an automation system.

In accordance with FIG. 1, the automation system 1 includes two subsystems 2, 2', which jointly control a technological process P, for example a burner installation. For this purpose, signals indicative of the current state of the process P are transmitted by the transmitters 3, 3' to the subsystems 2, 2'. The transmitted process signals are processed in the central processing units 4, 4'. Based on the processing, switching commands are output to the final controlling elements 5, 5'.

The input signals are processed and the output signals are determined concurrently in the central processing units 4, 4'based on identical sequences of machine instructions MP, which are stored in the storage units 6, 6'.

The sequences of machine instructions MP contain run-time queries. When the subsystems 2, 2' reach such a run-time query, the run time of the subsystems 2, 2' since the last synchronization of the subsystems 2, 2' is retrieved from the timers (e.g., internal counters) 7, 7'. This run time is compared to a synchronization reference pattern that can be preset specifically to the application. If the run time retrieved from the timers 7, 7' is less than the synchronization reference pattern, the system continues to process the sequence of machine instructions MP. In such instances, the lack of synchronization upon reaching the run-time queries does not have an adverse effect since the differences in running time among the subsystems 2, 2' lie within tolerance limits.

If the run time retrieved from the timers 7, 7' exceeds the synchronization reference pattern, then the communications processors 8, 8' are invoked. The communications processors 8, 8' execute a synchronization routine, by means of which the subsystems 2, 2' synchronize themselves to one another. Data are thereby exchanged between the communications processors 8, 8', inter alia, via the communication line 9. The synchronization itself follows in a generally known manner, and as such, will not be explained in greater detail. After a synchronization has been performed, the timers 7, 7' are reset.

It was described above that the sequences of machine instructions MP are immediately executed further, independently of one another, when the run times of the subsystems 2, 2' do not yet exceed the synchronization reference pattern. However, the following procedure may be used as an alternative.

In the alternative method, when a run-time query is first reached by the subsystem 2, the central processing unit 4 of the subsystem 2 pauses and signals via the communications processor 8 and the communication line 9 to the communications processor 8' of the subsystem 2' that the run-time query has been reached. The run-time query itself is not executed by the subsystem 2 until the subsystem 2' has also reached the corresponding run-time query in its sequence of machine instructions MP and when the subsystem 2' has reported this fact via the communications processor 8' and the communication line 9 to the communications processor 8 of the subsystem 2. In this manner, a virtually instruction-controlled synchronism of the running of the two subsystems is achieved.

In this case, to avoid instances of system blocking, the sequence of machine instructions MP must continue to be processed in the subsystem 2 if the subsystem 2' does not acknowledge, within a preselectable waiting period, that the corresponding run-time query has been reached.

Figure 2:
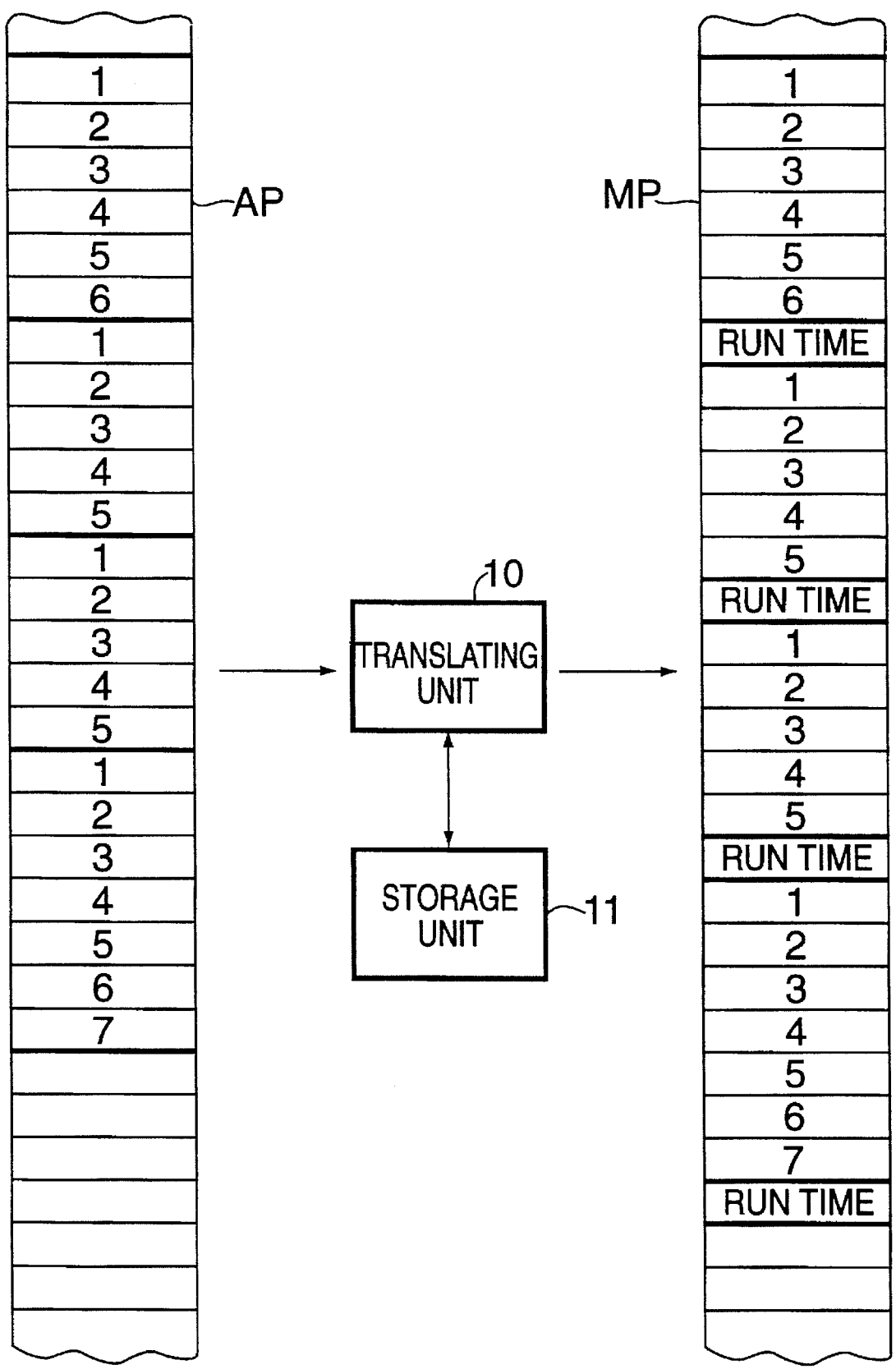
FIG. 2 illustrates the principle of the method of the present invention for generating machine instructions.

As shown in FIG. 2, the sequence of machine instructions MP from the application program AP is produced by means of a translating unit 10. The application program AP consists of a sequence of user-originated commands, which can be written in a standard language or in an assembler code. For each command, a corresponding run time is stored in the storage unit 11. When the instructions of the application program AP are compiled, the corresponding run times are retrieved by the translating unit 10 from the storage unit 11 and summed to obtain a run-time expected value. At the latest, when the run-time expected value exceeds a preselectable critical time, a run-time query is inserted into the sequence of machine instructions, and the run-time expected value is reset. The critical time can be specifically defined based on the application.

Independently of the current run-time expected value, a run-time query is always inserted into the sequence of machine instructions when the application program AP contains a jump (branching) instruction, in particular a conditional jump (branching) instruction. The run-time query is inserted into the sequence of machine instructions MP before the jump (branching) instructions.

The preselectable critical time is preferably considerably less than the synchronization reference pattern. A typical synchronization reference pattern lies, for example, within the range of between 5 and 20 ms while the critical time typically is of the order of 1 ms.

The translating unit 10 can be optionally designed as a compiler or as an interpreter. When a compiler is used as the translating unit 10, the translating unit 10 must be present only once since the machine program MP can be generated as often as needed, for example by means of copying, and can then be stored in the subsystems 2, 2'. However, when an interpreter is used as the translating unit, the translating unit 10 must be present in each of the subsystems 2, 2'. This entails additional costs. The cost disadvantage is particularly serious when not just two, but rather three or four subsystems are present.

The automation system 1 can be both a programmable controller, as well as a process control system or a process control computer.

What is claimed is:

1. A synchronization method for a redundantly structured automation system including two subsystems interconnected via communication means comprising steps of:

a) concurrently executing, in the subsystems, identical sequences of machine instructions for the subsystems, the sequences of machine instructions containing run-time determination instructions;

b) determining the actual run time of one of the subsystems since the last synchronization of the subsystems when said one of the subsystems reaches a run-time determination instruction; and c) invoking a synchronization routine in said one of the subsystems when the actual run time of said one of the subsystems exceeds a preselectable synchronization reference pattern.

2. The synchronization method according to claim 1 further comprising a step of:

executing a run time determination instruction when the run-time determination instruction is reached by one of the subsystems, only when the other subsystem reaches a corresponding run-time determination instruction in its sequence of machine instructions.

3. The synchronization method according to claim 1 further comprising the steps of:

generating the sequences of machine instructions from an application program;

summing run times of the machine instructions when the sequences of machine instructions are generated to obtain a run-time expected value; and inserting a run-time determination instruction into the sequence of machine instructions and resetting the run-time expected value at least when the run-time expected value exceeds a preselectable critical time.

4. The synchronization method according to claim 3 further comprising a step of:

inserting a run-time determination instruction into the sequence of machine instructions prior to every jump instruction.

5. The synchronization method according to claim 3 further comprising a step of:

inserting a run-time determination instruction into the sequence of machine instructions prior to every conditional jump instruction.

6. The synchronization method according to claim 3 wherein the critical time is less than the synchronization reference pattern.

7. The synchronization method according to claim 3 wherein the critical time is on the order of 1 ms and the synchronization reference pattern lies in a range between 5 ms and 20 ms.

8. A method for generating a sequence of machine instructions from an application program for at least two subsystems of a redundantly structured automation system comprising steps of:

a) summing run times of the machine instructions when the sequences of machine instructions are generated to obtain a run-time expected value; and b) inserting a run-time determination instruction into the sequence of machine instructions and resetting the run-time expected value at least when the run-time expected value exceeds a preselectable critical time.

9. The generation method according to claim 8 further comprising a step of:

inserting a run-time determination instruction into the sequence of machine instructions prior to every jump instruction.

10. The generation method according to claim 8 further comprising a step of:

inserting a run-time determination instruction into the sequence of machine instructions prior to every conditional jump instruction.

11. The generation method according to claim 8 wherein the critical time is less than the synchronization reference pattern for synchronizing the subsystems.

12. The synchronization method according to claim 8 wherein the critical time is on the order of 1 ms and the synchronization reference pattern lies in a range between 5 ms and 20 ms.

* * * * *